Aug. 19, 1952  B. W. JONES  2,607,831
OVERLOAD PROTECTIVE SYSTEM FOR DYNAMOELECTRIC MACHINES
Filed Oct. 12, 1950  2 SHEETS—SHEET 1
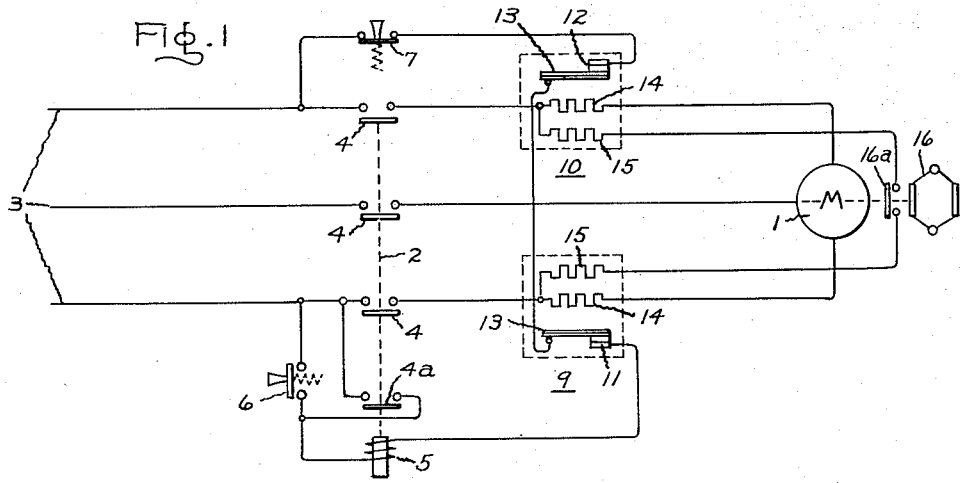
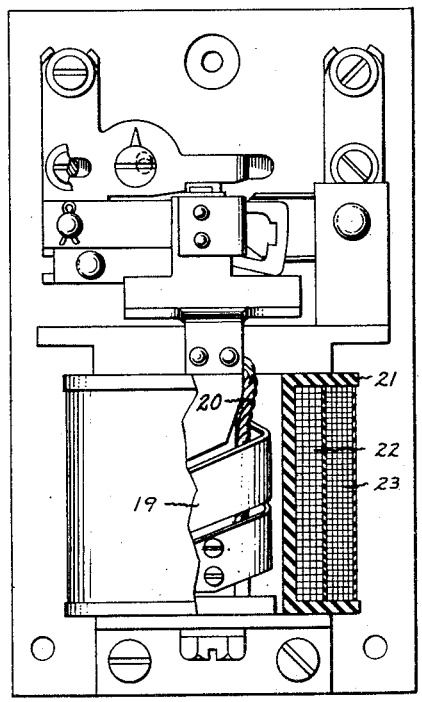
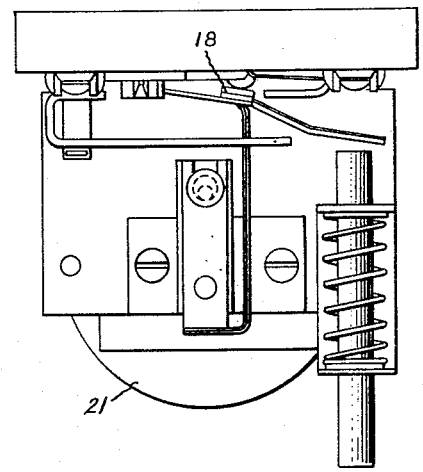
Inventor
Benjamin W. Jones
by *Clark F. Mott*
His Attorney

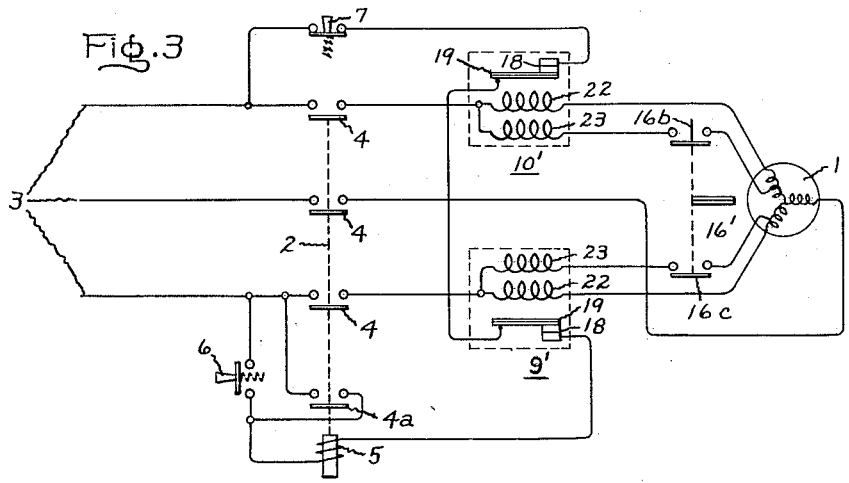
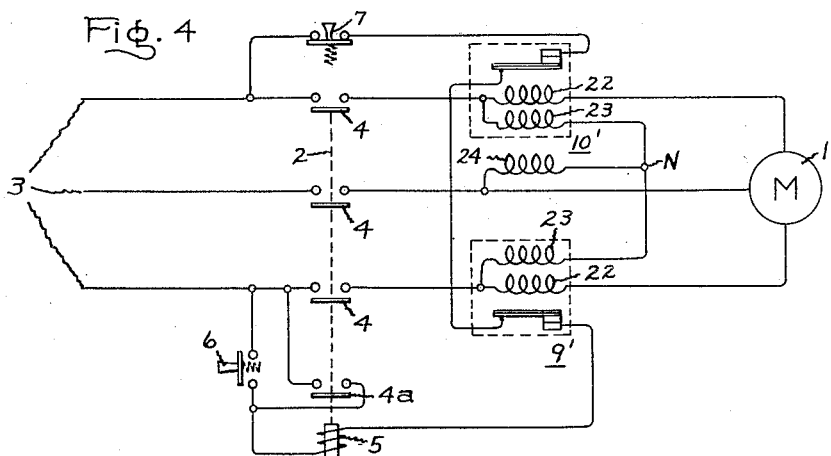
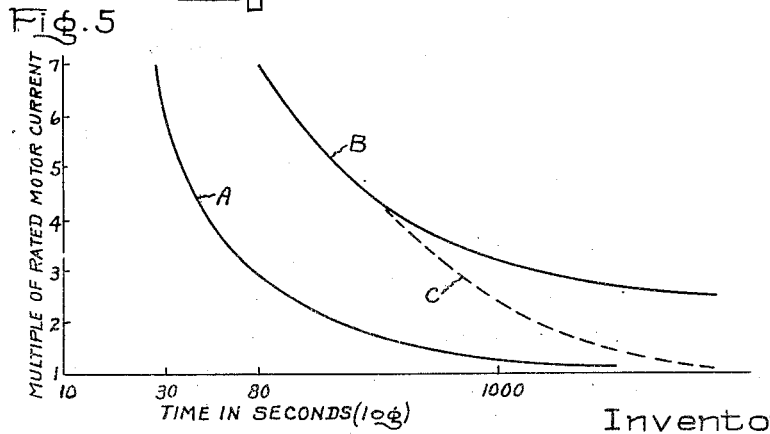

Patented Aug. 19, 1952

2,607,831

UNITED STATES PATENT OFFICE 2,607,831

OVERLOAD PROTECTIVE SYSTEM FOR DYNAMOELECTRIC MACHINES

Benjamin W. Jones, Schenectady, N. Y., assignor to General Electric Company, a corporation of New York Application October 12, 1950, Serial No. 189,821

1 Claim. (Cl. 175—294)

My invention relates to electric protective systems, and more particularly to overload protective systems for dynamo-electric machines such as electric motors and the like. The invention is particularly applicable to electric motors of the squirrel-cage induction type connected to drive large inertia loads.

It has been found very difficult adequately to protect electric motors, and particularly squirrel-cage induction motors, when they are connected to accelerate large inertia loads. One of the principal reasons for this difficulty is that overcurrent protective devices, such as current responsively heated thermo-responsive relays, for example of the bimetallic type, have a fixed inverse time-current characteristic which is unable to distinguish between a stalled motor and a running motor. To illustrate this difficulty, it is known that a standard motor when carrying twice its rated current will reach its maximum permissible temperature in approximately five minutes if it is stalled; but it will require about 30 minutes to reach this same temperature if the motor is running.

When such a motor is connected to drive a large inertia load, such as a centrifuge, the motor must be permitted to carry considerably more than its rated current during the relatively long accelerating interval when the motor is running, and must also be protected against a stalled rotor condition. The inverse time-current characteristic of a simple overcurrent protective device, however, is such that if the response of the device is made sufficiently rapid to protect the motor against a stalled rotor condition, it will remove the motor from the line before it has accelerated a large inertia load, due to the failure of the overcurrent device to distinguish between stalled and running motor ventilating conditions. On the other hand if the overcurrent device is endowed with a slower response, so that it will permit the motor to accelerate its load, then the device will not adequately protect the motor against the stalled rotor condition.

In accordance with my invention the foregoing dilemma is resolved by providing new and novel means for controlling the energization of an overload protective relay, and particularly a current responsively heated thermal relay.

Accordingly, therefore, it is a general object of my invention to provide a new and improved electric overload protective system for dynamoelectric machines.

It is another object of my invention to provide a new and improved overload protective system including a circuit controlling device in which the heating effect taking place in a dynamo-electric machine under various conditions of operation may be more closely simulated.

It is still another object of my invention to provide adequate electric overload protection for a dynamo-electric machine, and particularly a squirrel-cage induction motor, under various conditions of operation and heat dissipation.

It is a still further object of my invention to provide adequate overload protection for an electric motor in both stalled and running conditions.

It is a more particular object of my invention to provide adequate stalled and running overload protection for an electric motor connected to drive a large inertia load.

In carrying out my invention in one form I provide in a motor circuit, an overload relay having an inverse time-current characteristic and adjusted to respond just sufficiently rapidly to protect the motor against a stalled rotor condition. To this relay I add a voltage responsive control arranged initially to be ineffective and thereafter to accelerate response of the relay, thereby to protect the motor against running overload conditions.

My invention itself will be more fully understood and its various objects and advantages further appreciated by referring now to the following detailed specification taken in conjunction with the accompanying drawing, in which Fig. 1 is a schematic circuit diagram of a motor overload protective system embodying my invention in one form; Figs. 2 and 2a are front and top elevation views, respectively, of a thermal relay adapted for use in conjunction with my invention; Figs. 3 and 4 are schematic circuit diagrams of other embodiments of my invention utilizing the relay of Figs. 2 and 2a; and Fig. 5 is a graphical representation of certain inverse time-current overload relay characteristics illustrative of the operation of my invention.

Referring now to the drawing, I have shown at Fig. 1 a three phase electric motor 1, for example a squirrel-cage induction motor, arranged to be connected through a contactor 2 to a three phase alternating current line 3 which is in turn connected to a suitable source of electric current supply (not shown). The contactor 2 is provided with three normally open line contacts 4, an actuating winding 5 and a normally open interlock contact 4a. The contactor actuating winding 5 is arranged to be connected across one phase of the alternating current supply line 3 through a pair of manual control switches, such as a normally open push button 6 and normally closed push button 7, and the contacts of a pair of overload protective relays 9 and 10, all in series circuit relation. The relay 9 is provided with a pair of normally closed contacts 11, and the relay 10 is provided with a pair of normally closed contacts 12. Since these relay contacts 11 and 12 are in series circuit relation, either pair of contacts may open the holding circuit for the contactor coil 5. The relays 9 and 10 are identical in structure and are connected for energization in two separate phases of the three phase line and on the load side of the contactor 2. The contactor 2 when picked up completes a holding circuit for its coil 5 through its normally open interlock contact 4a which is connected to shunt the push button 6.

In the embodiment of the invention illustrated at Fig. 1 each overload relay 9, 10 includes a thermally deformable bimetallic member 13 arranged when heated to separate its associated pair of contacts 11 or 12. Each overload relay also includes a pair of energizing elements, such as resistance heaters 14 and 15, arranged to heat the associated bimetallic member 13 in accordance with the predetermined overload conditions. The heaters 14 are connected in series with the motor 1 in separate phases of the motor circuit. The heaters 14 thus carry motor line current, so that they effect heating of the associated bimetallic strips 13 as a function of motor current. The heaters 15 are arranged to be connected in series circuit relation across two terminals of the motor through a time element switch such as a centrifugal switch 16. Thus the heaters 15, when connected, are responsive to motor voltage and effect heating of the associated bimetallic strips 13 as a function of the voltage applied to the motor.

The centrifugal switch 16 is connected to be driven by the motor 1 and is provided with a movable contact 16a which is normally open and arranged to be closed when the motor attains a predetermined speed. The switch 16 thus completes an energizing circuit for the voltage responsive overload relay heaters 15 after a delay interval following initiation of energization of the motor and the current responsive relay heaters 14. It will be evident to those skilled in the art as the description proceeds that the time element switch 16 need not necessarily be a centrifugal switch, but may be any suitable form of time delay switch, such as a bimetallic switch positioned for response to motor frame or motor winding temperature. It will also be appreciated by those skilled in the art if so desired a thermistor of a type having a negative resistance-temperature characteristic may be utilized to control energization of the heaters 15. Preferably a thermistor so used is one demonstrating an abrupt change in resistance at a predetermined temperature. Such a thermistor may, for example, suitably be formed of a silver sulphide composition as described in the copending application of Frederic R. Quinn, Serial No. 106,293, filed July 22, 1949, and assigned to the same assignee as the subject application. A thermistor of this type demonstrates such an abrupt change in resistance within a narrow range of temperature that it serves effectively as a switch to either close or open a circuit.

To illustrate the operation of my invention reference may now be had to the graphical representation shown at Fig. 5. In this figure I have shown a curve A a typical inverse time-current characteristic for a current responsively heated temperature overload relay. It will be noted that this curve A is asymptotic to normal current, i. e., 1 times rated current. A relay having the characteristic A, however, will prematurely disconnect a motor which is accelerating a large inertia load. At curve B I have shown another inverse time-current characteristic of such a relay wherein, by reducing the effect of current responsive heating, the curve has been so shifted that the relay tripping time under stalled rotor conditions, i. e., 6 or 7 times rated motor current, is just sufficient to protect the stalled motor. The characteristic curve B, however, indicates that the relay is incapable of protecting the motor under running overload conditions, the curve B being asymptotic to approximately 2½ times rated motor current. In accordance with my invention I arrive at a compromise between the relay characteristics illustrated in the curves A and B by providing supplementary heating for the thermal responsive relay as a function of motor voltage. As previously described, this is accomplished by connecting the shunt heater windings 15 for energization through the time delay switch 16 after a delay interval determined from initiation of energization of the current responsive heater winding 14. The supplementary heat added by the voltage responsive heater winding elements 15 decreases the time of response of the relay at the low current end of the characteristic curve, as illustrated by the broken line C Fig. 5, and sufficient supplementary heat is provided so that the resultant curve B—C is asymptotic to 1 times normal rated motor current. This combined or resultant relay characteristic curve is illustrative of a relay which responds at the high current end of the curve just sufficiently rapidly to protect the motor against stalled rotor conditions, permits the application of a somewhat less overload current for an appreciable length of time sufficient to accelerate a large inertia load, and ultimately protect the motor under running overload conditions.

At Figs. 2 and 2a I have shown another form of thermal overload relay which may be utilized in conjunction with my invention. The relay shown at Figs. 2 and 2a is of the induction type, and comprises a pair of contacts 18 which are normally latched closed and arranged to be opened by a helical bimetallic thermal responsive member 19 when the member 19 is heated. The helical bimetallic member 19 is coiled flatwise about an iron core and is connected together at its end by a flexible conductor 20. Upon a spool 21 surrounding the bimetallic member 19 there are provided two induction coils 22 and 23 wound one upon the other, the coil 22 being a current coil and the coil 23 being a potential coil. The coils 22 and 23 are in inductive relation with each other and with the short circuited bimetallic helic 19. The helical bimetallic member 19 thus acts as a short circuited secondary winding of a transformer, and is heated in response to current in the coils 22 and 23. This relay is more fully described and claimed in Patent 2,234,700—Jones, issued March 11, 1941.

At Fig. 3 I have shown a schematic circuit diagram of a motor overload protective system embodying my invention and utilizing the induction type overload relay shown at Figs. 2 and 2a. The protective system shown at Fig. 3 is similar in many respects to that shown at Fig. 1, and like parts have been assigned the same reference numerals. At Fig. 3 the motor 1 is shown as a 3 phase Y-connected motor and the overload relays 9' and 10' correspond in function to the overload relays 9 and 10 of Fig. 1. The relays 9' and 10' of Fig. 3, however, are of the type shown at Figs. 2 and 2a, and comprise current voltage-responsive energizing windings 22 and 23, respectively, in place of resistance heaters. The current-responsive windings 22 of the relays 9' and 10' are connected in series circuit relation in separate phases with the motor line. The potential or voltage windings 23 of the relays 9' and 10' are arranged to be connected by means of a thermal time delay switch 16' across like portions of separate phases of the motor stator windings. Such connection of the potential coils 23 ensures that the current in the coil 23 of each overload relay will be substantially in phase with the current in the coil 22 of the same relay. The thermal time delay switch 16' is provided with normally open contacts 16b and 16c, each arranged to effect connection of one of the relay voltage coils when the motor has attained a predetermined temperature, the thermal responsive member of the switch 16' being positioned for response to motor temperature.

In operation, the overload protective system illustrated at Fig. 3 functions in a manner entirely similar to that of Fig. 1, and its mode of operation will be evident to those skilled in the art from the prior description of the operation of the system of Fig. 1. In further connection with the protective system shown at Fig. 3, however, it might be pointed out that, if desired, the thermal time delay switch 16' may be dispensed with and the overload relay voltage winding 23 permanently connected across the motor windings. With such connection the system still operates in the manner described in conjunction with Fig. 1, by reason of the fact that the inductive coupling between the energizing windings 22 and 23 of each overload relay 9', 10', effects a sufficient transient bucking of the current in the voltage windings 23, as long as the motor current is high so that the voltage winding 23 of each relay is not effectively energized until after a delay interval following energization of the associated current winding 22. This transformer action thus affects a delay in energization of the voltage-responsive winding 23 similar to that effected by interposition of the time delay switch 16'.

At Fig. 4 I have shown still another embodiment of my invention similar to that of Fig. 3 and utilizing induction type thermal overload relays 9' and 10'. In the protective system shown at Fig. 4 no time element switch is shown for connecting the voltage-responsive relay windings 23, the transformer action described above being relied upon to produce a delay in effective energization of these windings. In addition Fig. 4 illustrates the manner in which the voltage-responsive relay windings may be connected when the motor 1 is a 3 phase delta-connected motor so that no neutral terminal is available, or when it is desirable not to run the extra shunt wires to the motor. In this case an equivalent neutral point N is provided outside the motor by connecting the voltage-responsive relay windings 23 together at the point N and connecting between the point N and the third phase of the motor line an inductance coil 24 having an inductance of approximately the same value as that of each coil 23. It will be evident to those skilled in the art that such a connection of the overload relay voltage coils may be utilized in conjunction with either a delta-connected motor or a Y-connected motor. This equivalent neutral connection is necessary in the case of a delta-connected motor in order to ensure that the current in each relay winding 23 is substantially in phase with the current in the associated relay winding 22. While the same connection may be utilized in conjunction with a Y-connected motor, the more direct connection shown at Fig. 3 may also be used for a Y-connected motor.

The mode of operation of the protective system shown at Fig. 4 will be entirely clear from the operation described above in conjunction with Figs. 1 and 3. It will be further evident to those skilled in the art that if desired a third complete overload relay similar to the relays 9' and 10' may be connected in the third line in place of the coil 24.

While I have described only certain preferred embodiments of my invention by way of illustration, many modifications will occur to those skilled in the art, and I therefore wish to have it understood that I intend in the appended claim to cover all such modifications as fall within the true spirit and scope of my invention.

What I claim as new and desire to secure by Letters Patent of the United States is:

In an overload protective system for an alternating current electric motor, means for completing a circuit between said motor and a source of alternating current supply, a thermally responsive movable control element connected when actuated to disable said circuit, induction means including a first coil for heating said element as a function of the current in said motor, said element when solely so heated having an inverse time-current characteristic sufficient to protect said motor under stalled rotor conditions but insufficient to protect said motor under running overload conditions, and second induction means including a second coil inductively coupled with said first coil and connected to additionally heat said element as a function of the voltage impressed upon said motor, said first and second coils being connected to carry currents in substantial phase identity whereby the inductive coupling between said first and second coils act as time element means to delay the energization of said second coil with respect to said first coil.

BENJAMIN W. JONES.

REFERENCES CITED

The following references are of record in the file of this patent:

UNITED STATES PATENTS

| Number | Name | Date |
| --- | --- | --- |
| 1,658,254 | Radley | Feb. 7, 1928 |
| 1,805,492 | Macmillan | May 19, 1931 |
| 1,951,243 | Hodgkins | Mar. 13, 1934 |
| 2,234,700 | Jones | Mar. 11, 1941 |
| 2,252,444 | Stimson | Aug. 12, 1941 |
| 2,306,810 | Jones | Dec. 29, 1942 |
| 2,463,935 | Fish et al. | Mar. 8, 1949 |
| 2,483,515 | Alexander | Oct. 4, 1949 |